United States Patent [19]
Waid et al.

[11] Patent Number: 5,983,163
[45] Date of Patent: Nov. 9, 1999

[54] METHOD FOR COMPUTING DIP OF EARTH FORMATIONS FROM WELLBORE IMAGE DATA

[75] Inventors: Charles Carter Waid, Houston; John F. Priest, Tomball, both of Tex.

[73] Assignee: Western Atlas International, Inc., Houston, Tex.

[21] Appl. No.: 09/148,399

[22] Filed: Sep. 4, 1998

[51] Int. Cl.⁶ ........................... G01V 1/28
[52] U.S. Cl. ........................... 702/10; 702/6
[58] Field of Search ........................... 702/106, 117, 702/111, 110, 10; 367/125, 134; 324/355.5, 333.3

[56] References Cited

U.S. PATENT DOCUMENTS

| | | | |
|---|---|---|---|
| 4,302,723 | 11/1981 | Moran | 324/343 |
| 4,357,660 | 11/1982 | Hepp | 364/422 |
| 4,414,656 | 11/1983 | Hepp | 367/25 |
| 4,453,219 | 6/1984 | Clavier et al. | 364/422 |
| 4,567,759 | 2/1986 | Ekstrom et al. | 73/152 |
| 4,736,347 | 4/1988 | Goldberg et al. | 367/46 |
| 4,829,487 | 5/1989 | Malloy | 367/40 |
| 4,852,005 | 7/1989 | Hepp et al. | 364/422 |
| 4,980,643 | 12/1990 | Gianzero et al. | 234/339 |
| 5,162,994 | 11/1992 | Torres | 364/422 |
| 5,502,686 | 3/1996 | Dory et al. | 367/34 |
| 5,724,309 | 3/1998 | Higgs et al. | 367/48 |
| 5,771,984 | 6/1998 | Potter et al. | 175/14 |
| 5,831,935 | 11/1998 | Luo et al. | 367/47 |

*Primary Examiner*—Christine Oda
*Assistant Examiner*—Victor J. Taylor
*Attorney, Agent, or Firm*—Richard A. Fagin

[57] ABSTRACT

A method for calculating the orientation of a geologic feature with respect to the axis of a wellbore drilled through earth formations. The method uses finely detailed measurements of a selected property of the earth formations made along the wall of the wellbore. The method includes the steps of segregating the finely detailed measurements by an angle subtended with respect to an arbitrary reference on the circumference of the wellbore. The measurements are further segregated into a selected axial interval along the wellbore. For each segment, for each subtended angle, the segregated measurements are spectrally analyzed with respect to spatial frequency. Coefficients of a best fit curve are determined for the phase components of the spectrally analyzed measurements with respect to the subtended angle. The orientation of the geologic feature is calculated from the best fit curve. In the preferred embodiment a noise floor is calculated in each segment by stacking the amplitude components at each spatial frequency in each interval. For each spatial frequency, the stacked amplitude is compared to the noise floor. Only spatial frequencies having amplitudes above the noise floor are used to generate the best fit curve from their respective phase components.

12 Claims, 4 Drawing Sheets

METHOD FOR COMPUTING DIP OF EARTH FORMATIONS FROM WELLBORE IMAGE DATA

BACKGROUND OF THE INVENTION

1. Field of the Invention

The invention is related to the field of measurement of structural attitude ("dip") of earth formations. More specifically, the invention is related to methods for processing data from "imaging" well logging instruments, for calculating the structural attitudes of the earth formations.

2. Description of the Related Art

Well logging instruments used to determine the structural attitude ("dip") of earth formations are of two general types. First are the so-called "diplog" or "dipmeter" instruments which measure formation resistivity to very fine detail (high axial resolution) along the wall of a wellbore drilled through the earth formations. The resistivity is measured at three or more circumferentially spaced apart positions around the wellbore. Differences in the axial position, from one of the circumferentially spaced apart position to the others, of any changes in value of the resistivity are calculated from the measurements. The differences in the axial positions of changes in the resistivity values are used to calculate the dip of the earth formations. The assumption being made in these calculations is that changes in resistivity values correspond directly to different depositional layers of the earth formations. Representative methods for calculating dip are shown in U.S. Pat. No. 4,414,656 issued to Hepp and U.S. Pat. No. 4,453,219 issued to Clavier et al.

More recently, well logging instruments have been developed which make even more finely detailed measurements of resistivity. These more recent instruments, known in the art as "imaging" devices, make measurements which cover the circumference of the wellbore substantially continuously. The measurements of resistivity can be converted to an optical (visual) presentation where color or grey scale density corresponds to the resistivity, so that the visual presentation, or "image", of the wellbore wall can be obtained. See for example U.S. Pat. No. 4,567,759 issued to Ekstrom et al.

Another type of "imaging" instrument, known as an ultrasonic acoustic imaging instrument, uses reflectance amplitude and travel time of ultrasonic energy to generate an image of the wellbore wall. The acoustic imaging instrument has been also combined with the resistivity instrument into a single well logging tool. See for example U.S. Pat. No. 5,502,686 issued to Dory et al.

Irrespective of the type of imaging instrument used, dip calculations made from the image data are made in substantially the same manner as for the diplog instruments. It has become apparent from the visual representations made by imaging instruments that the prior art methods for calculating dip do not satisfactorily resolve dip when there are both "structural" and "stratigraphic" components to the dip in certain earth formations. The term structural dip describes the overall attitude of a particular stratigraphic unit or layer. It is generally believed that sedimentary earth formations, which are the kind most commonly measured by well logging instruments, were originally deposited horizontally. As large portions of the earth's crust underwent structural movement, the overall attitude of these layers could have been shifted from horizontal. The change in attitude results in the structural dip. Sometimes the forces which move the large sections of the earth's crust cause the sedimentary layers to bend or "fold" as well as shift from horizontal. Some components of dip can be associated with folding as well as gross overall change in attitude. Sedimentary earth formations also can have layering features related to the environment in which the sediments were deposited. These features can impart significant attitude changes within a single earth formation layer. These intra-layer attitudes are generally known as stratigraphic dip. It has proven difficult using prior art methods of dip calculation to resolve stratigraphic dip where a structural dip is also imposed on the same earth formations or where fold-related dip is superimposed on structural and stratigraphic dips.

SUMMARY OF THE INVENTION

The invention is a method for calculating the orientation of a geologic feature with respect to the axis of a wellbore drilled through earth formations. The method uses finely detailed measurements of a selected property of the earth formations made along the wall of the wellbore. The method includes the steps of segregating the finely detailed measurements by an angle subtended with respect to an arbitrary reference on the circumference of the wellbore. The measurements are further segregated into a selected axial interval along the wellbore. For each segment, for each subtended angle, the segregated measurements are spectrally analyzed with respect to spatial frequency. Coefficients of a best fit curve are determined from the phase components of the spectrally analyzed measurements with respect to the subtended angle. The orientation of the geologic feature is calculated from the best fit curve.

In the preferred embodiment of the invention, a noise floor is calculated in each segment by stacking the amplitude components at each spatial frequency in each interval. For each spatial frequency, the stacked amplitude is compared to the noise floor. Only spatial frequencies having amplitudes above the noise floor are used to generate the best fit curve from their respective phase components.

In a particular embodiment, the phase components are adjusted for wellbore out of round and logging instrument eccentering in the wellbore by calculating an average wellbore radius over each segment for the measurements at each subtended angle, and dividing the phase component from each frequency in each segment/angle column by the average wellbore radius for that angle/column.

DESCRIPTION OF THE PREFERRED EMBODIMENT

The invention uses finely detailed measurements of a selected physical property of earth formations made circumferentially around the wall of a wellbore drilled through the earth formations. The selected property can include resistivity and/or acoustic reflectance and travel time measurements. These measurements can be processed into optical (visual) presentations using processing methods known in the art to provide "images" of the wellbore wall. These images typically have the value of the selected property represented by a corresponding color or gray scale intensity plotted with respect to circumferential position of the measurement and axial position along the wellbore. See for example, M. G. Kerzner, Image Processing in Well Log Analysis, IHRDC, Boston (1986).

A well logging instrument which can make both resistivity and acoustic reflectance/travel time measurements suitable for image generation is described in U.S. Pat. No. 5,502,686 issued to Dory et al, incorporated herein by reference. It should be clearly understood that either resistivity measurements or acoustic reflectance/travel time measurements can be used individually in the method of this invention and that it is not necessary to use both types of measurements simultaneously. It should also be understood that data from "imaging"-type well logging instruments such as the one described in the Dory et al '686 patent are not necessary in order to use the method of the invention. "Diplog" or "dipmeter" logging instruments known in the art which make detailed measurements of resistivity or other physical parameter of the earth formations at three or more circumferentially spaced apart positions around the wellbore wall may also be used to measure data which can be used in this invention. See for example U.S. Pat. No. 4,414,656 issued to Hepp for a description of a typical diplog instrument. The principal difference between the "imaging" instruments such as described in the Dory et al '686 patent and diplog instruments such as described in the Hepp '656 patent is the degree coverage of the circumference of the wellbore, the imaging instruments measuring about a much greater fraction of the circumference than the diplog instruments.

Figure 1:
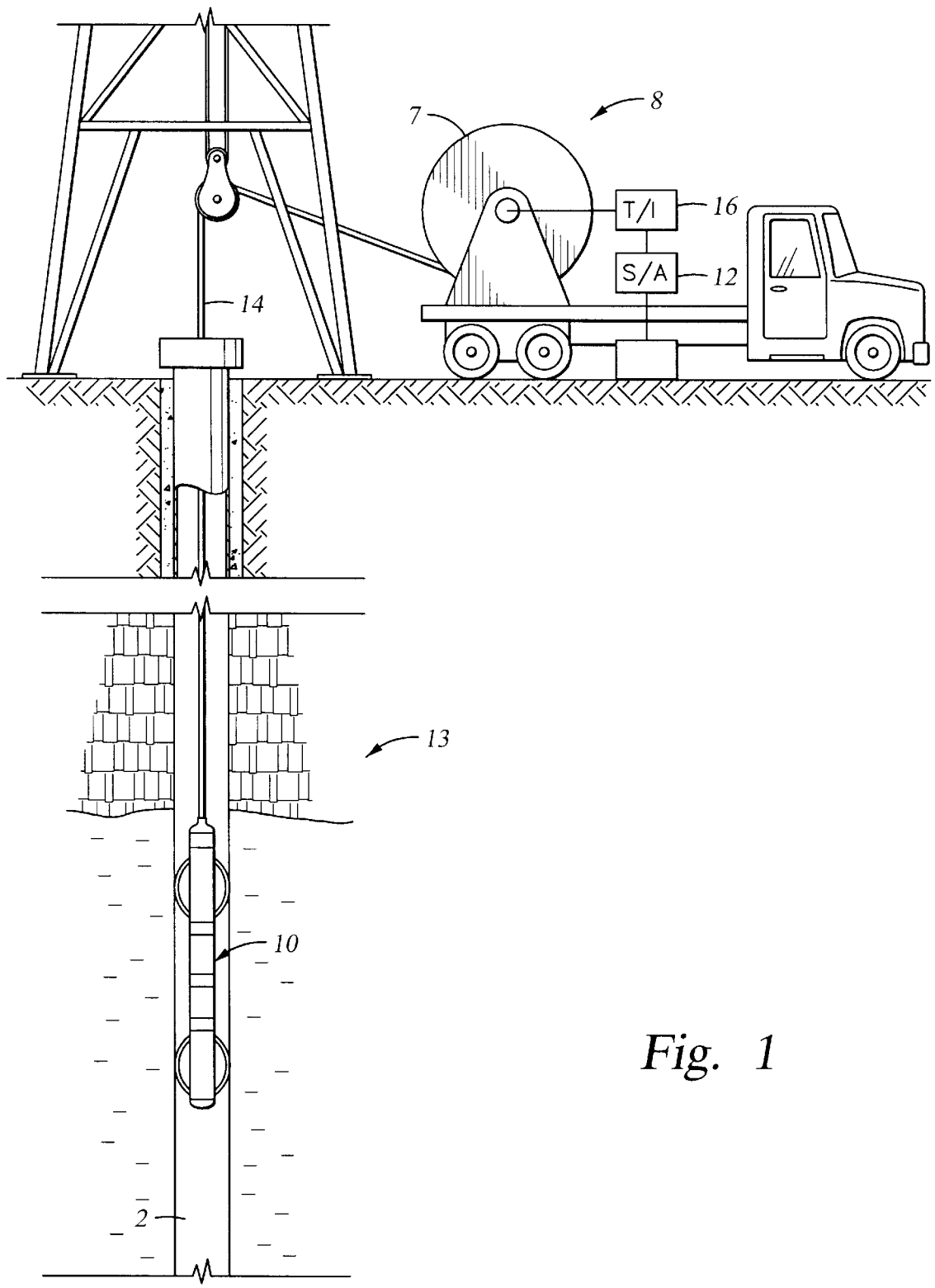
FIG. 1 shows an imaging well logging instrument disposed in a wellbore drilled through earth formations.

Referring to FIG. 1, the well logging instrument 10 is shown being lowered into a wellbore 2 penetrating earth formations 13. The instrument 10 can lowered into the wellbore 2 and withdrawn therefrom by means of an armored electrical cable 14. The cable 14 can be spooled by a winch 7 or similar device known in the art. The cable 14 is electrically connected to a surface recording system 8 of a type known in the art which can include a signal decoding and interpretation unit 16 and a recording unit 12. Signals transmitted by the logging instrument 10 along the cable 14 can be decoded, interpreted and recorded by the respective units in the surface recording system 8.

Figure 2:
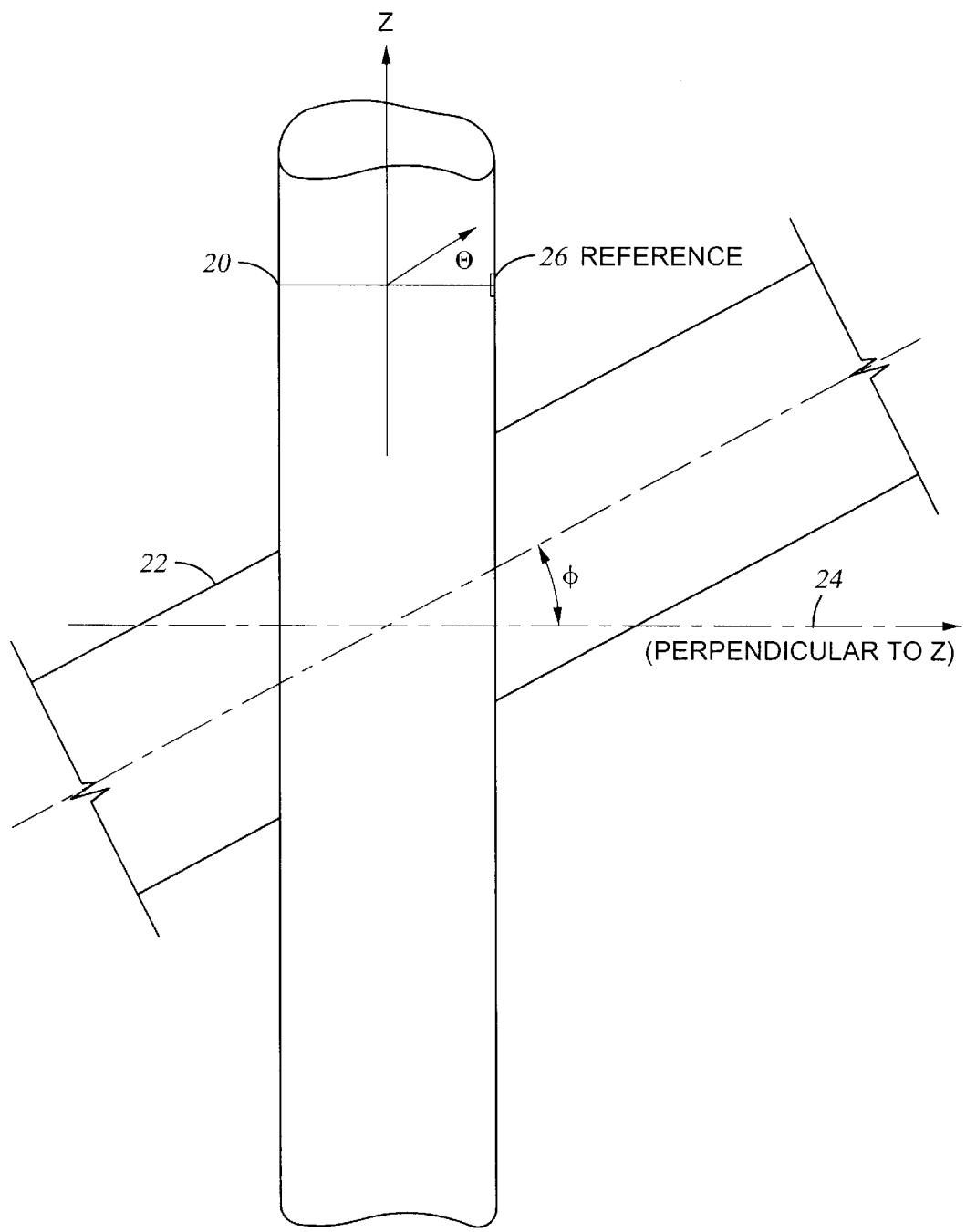
FIG. 2 shows a planar feature intersecting the wellbore from FIG. 1.

An explanation of the process of the invention begins by referring to FIG. 2, which shows the wellbore 20 being intersected by a stratigraphic feature 22. The feature 22 can be planar for purposes of simplifying the explanation of the invention, but as will be further explained, differently shaped features can also be characterized using the method of this invention. The feature 22 in this example can be a bed boundary or similar change in the earth's stratigraphy (e.g. mineral composition, rock grain size, depositional environment, etc.) known in the art. It is only necessary that the feature 22 cause some detectable change in the response of the logging instrument (10 in FIG. 1) in order to be useful in the method of this invention.

The feature 22, particularly a planar feature, can have an orientation with respect to the wellbore definable by an angle $\phi$ subtended between the plane defined by the feature 22 and a line 24 perpendicular to the axis z of the wellbore 20. Angle $\phi$ is generally known as the apparent dip magnitude. The plane of the feature 22 can also subtend an angle $\theta$ with respect to an arbitrary reference 26 on the circumference of the wellbore 20. Angle $\theta$ is generally known as the apparent dip azimuth. The reference 26 is most commonly along a line representing the gravitationally highest part of the wellbore 20, this line known in the art as the "high side" of the wellbore 20. It should be understood that the reference actually selected is a matter of convenience for the system designer and is not limited to the "high side". Dip computations known in the art can convert the angles $\phi$ and $\theta$ into the orientation of the plane defined by the feature 22 with respect to fixed geographic references such as magnetic (or geographic) north and the earth's gravity (vertical), but it is not necessary to perform this conversion to use this invention.

The well logging instrument (10 in FIG. 1) makes the previously described finely detailed measurements along the wall of the wellbore 20 in a manner enabling the measurements to be referenced with respect to an angle $\alpha$. This angle, $\alpha$, is subtended between the circumferential position the particular measurement and the arbitrary reference 26. For example, in the well logging instrument described in the Dory et al '686 patent, the acoustic imaging section (not shown separately) makes 250 individual ultrasonic pulse/echo measurements for each complete rotation of an acoustic transducer head in the instrument. Each of the 250 individual acoustic measurements can be segregated by the angle of its measurement with respect to the arbitrary reference. The measurements made by the electrical imaging section of this logging instrument can be similarly segregated by angle $\alpha$ with respect to the arbitrary reference 26, depending on the relative orientation of each of the six "pads" on which the resistivity measurements are made. The orientation of the individual measurements, as is known in the art, can be determined by various directional measurement sensors (not shown) which may be included in the logging instrument 10.

Figure 3:
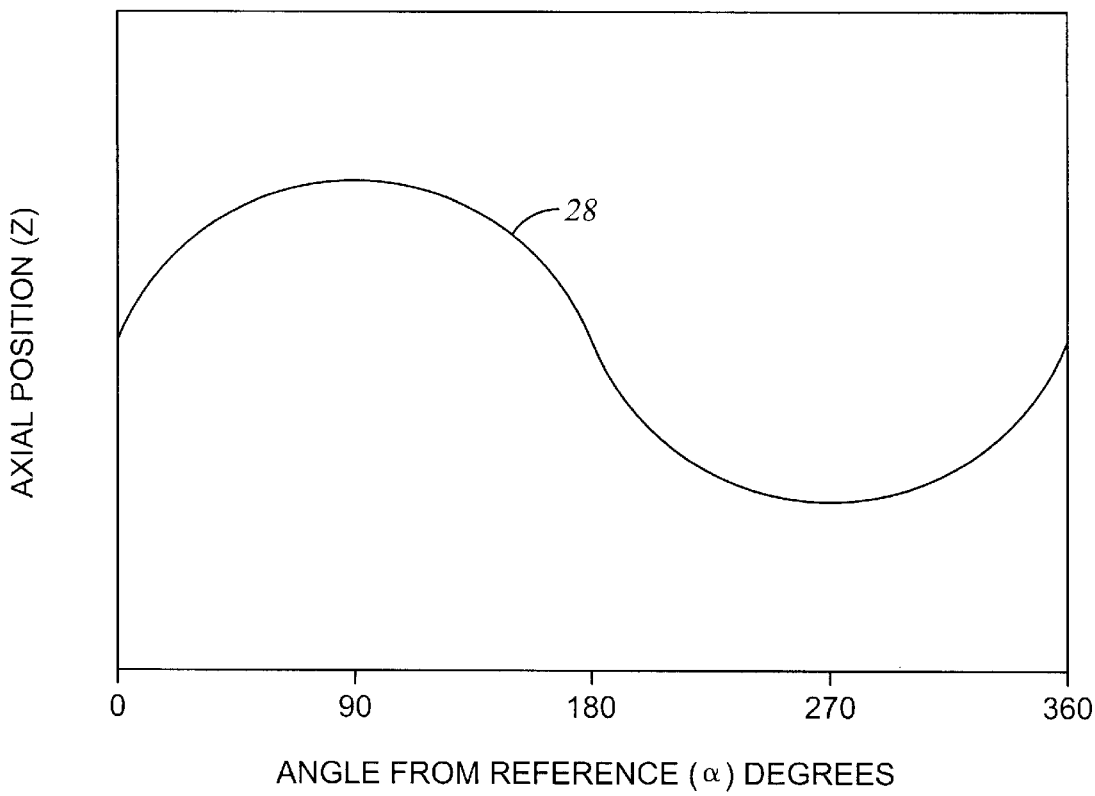
FIG. 3 shows an image of the intersection of the planar feature from FIG. 2, where the image is "unwrapped".

FIG. 3 shows an "image" presentation of the measurements made in the vicinity of the feature (22 in FIG. 2) as it intersects the wellbore (20 in FIG. 2). The feature 22 can be observed as a sinusoid 28 in the image presentation of FIG. 3. The image in FIG. 3 can be generated by combining all the measurements made by the instrument (10 in FIG. 1) along the same subtended angle $\alpha$ into same-orientation "columns", each column extending vertically with respect to the axial position along the wellbore at which the measurements were made. The axial position is more commonly known in the art as the measured depth in the wellbore. The sinusoid 28 can be a gray scale intensity or color-correspondent representation of the value of the selected property being measured by the logging instrument 10. Such image presentations as shown in FIG. 3 are familiar to those skilled in the art as an "unwrapping" of the image generated by the logging instrument.

Figure 4:
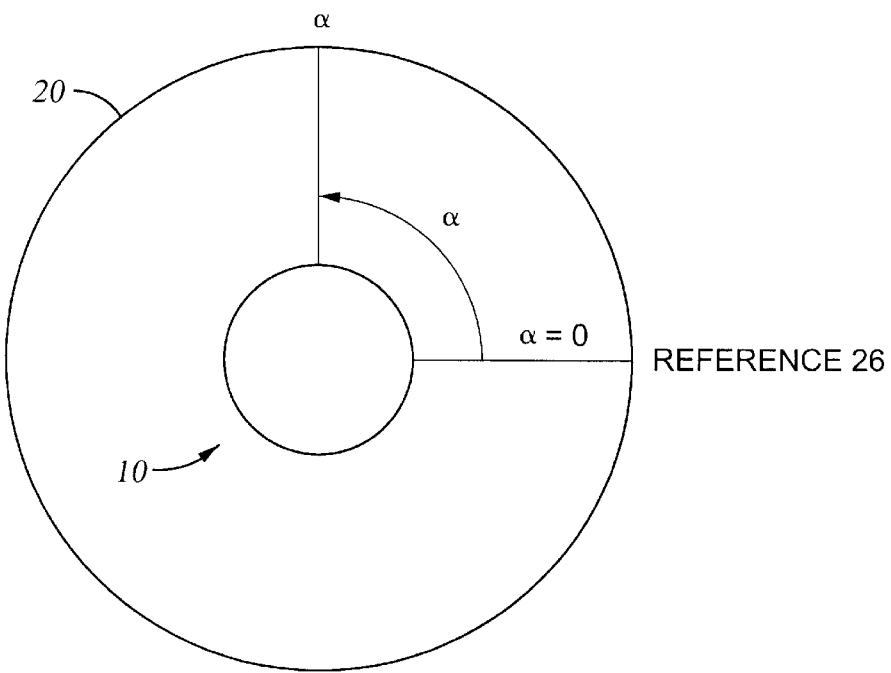
FIG. 4 shows a plan view of the logging instrument in the wellbore to show how the image data are segregated for processing according to the invention.

The orientation of the individual measurements which are used to generate the image shown in FIG. 3 can be better understood by referring to FIG. 4. The logging instrument 10 is shown disposed in the wellbore 20. The circumferential orientation with respect to the wellbore of the reference 26 corresponds to a subtended angle $\alpha$ equal to zero. Each measurement made around the circumference of the wellbore 20 has a corresponding angle $\alpha$ with respect to the arbitrary reference 26. Each measurement made at the same subtended angle $\alpha$ along the axis of the wellbore z can be combined into one of the previously described "columns". As the columns are combined according to their corresponding angle $\alpha$, the combination produces the image shown in FIG. 3.

When the feature (22 in FIG. 2) is substantially planar, the image will appear substantially as a sinusoid (28 in FIG. 3) and can be expressed in cylindrical coordinates by the expression:

$$s(\alpha)=z_0+r\tan(\phi)\cos(\alpha-\theta)=z_0+r[a\cos(\alpha)+b\sin(\alpha)] \quad (1)$$

By determining the coefficients a and b in equation (1), the angles φ and θ, and consequently the relative orientation of the feature 22, can be determined by the expressions:

$$\phi = \mathrm{atan}\!\left(\frac{c}{r}\right);\; \theta = \mathrm{atan}\!\left(\frac{b}{a}\right) \quad (2)$$

$$c = \sqrt{a^2 + b^2}$$

The process by which the coefficients a and b in equation (1) can be determined will be further explained.

Data which are recorded and segregated into each of the columns, identified by the subtended angle α, can be further discretized, for the convenience of processing, into axial segments, or intervals, each having a predetermined axial length along the wellbore. For purposes of testing the method of this invention, a segment "interval" length of 2 feet was used. It is clearly within the contemplation of this invention to use other interval lengths, including but not limited to 4 or 8 feet, for example. It should also be understood that the actual interval length selected is a matter of convenience for the system operator and is not meant to limit the invention. Any interval length convenient for processing the data can be used in this invention.

In the first step in the process of the invention, for each column, for each segment (interval), the data generated by the logging instrument can be converted by a Fourier transform or the like into the spatial frequency domain. As they are generated by the logging instrument, the data can be represented by a series of ordered pairs representing the axial position (depth in the wellbore) at which the data were measured, and the value of the particular parameter recorded at the particular depth and angle α.

After conversion to the spatial frequency domain, the values in each column/segment form a series of complex numbers, each having an index representing a spatial frequency, and an ordinate which is a complex number representing the content of the original measurements at that frequency. The complex numbers each include components representing an amplitude and a phase at the particular index spatial frequency. Fourier conversion is shown in the flow chart of FIG. 5 at box 50. Amplitude and phase values for each frequency (for each column/segment) can then be calculated from the complex numbers, using formulae well known in the art. Calculation of phase and amplitude is shown at box 52 in FIG. 5.

Figure 5:
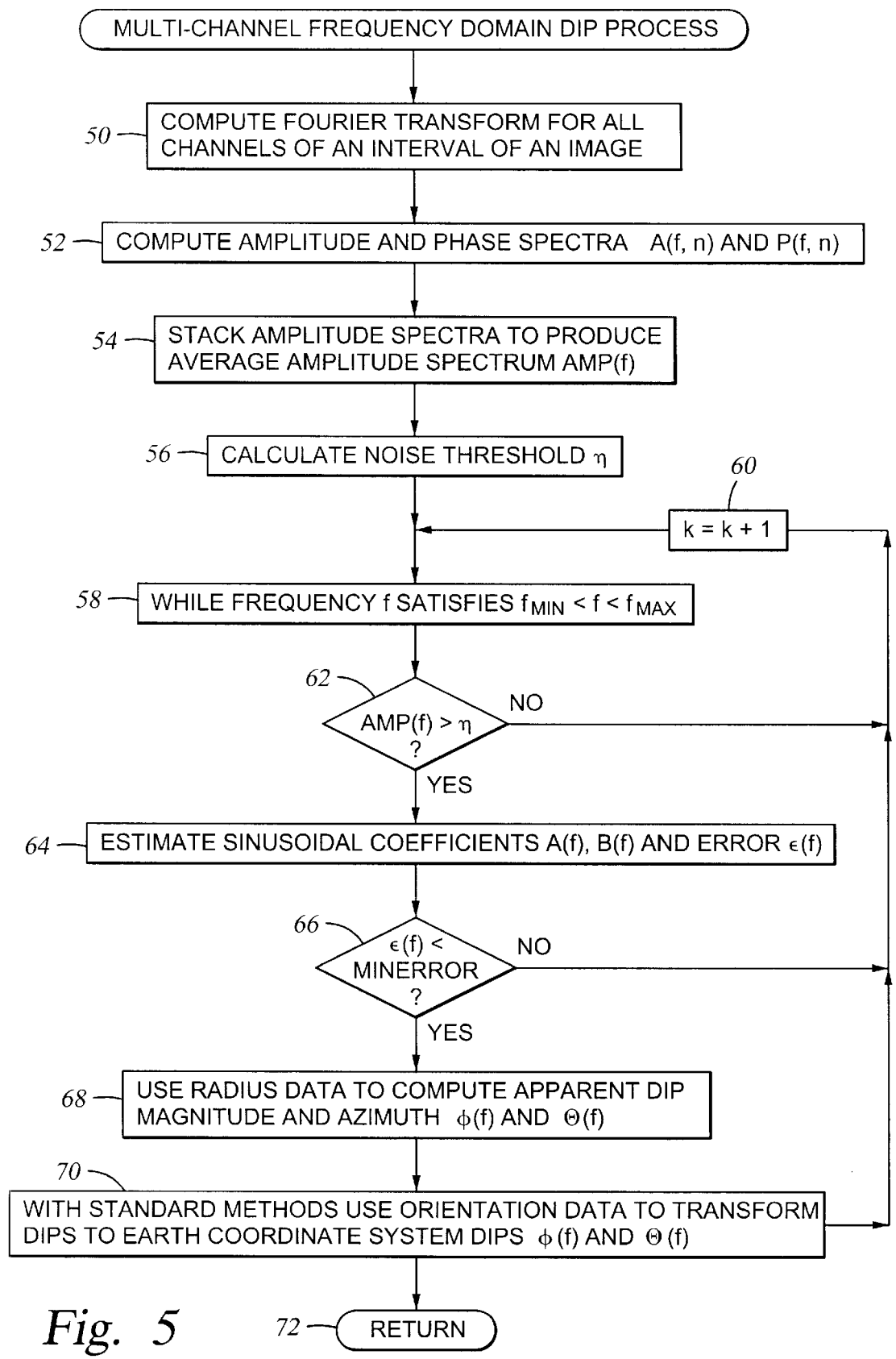
FIG. 5 shows a flow chart of the method of the invention.

The amplitude values thus calculated, for each spatial frequency, can then be summed or "stacked", as shown in FIG. 5 at box 54, typically by averaging the amplitude values in all the columns in one segment for each individual spatial frequency in the segment. The stacked, or averaged, amplitudes at each spatial frequency can then be used to calculate a noise threshold η as shown at box 56 in FIG. 5. The noise threshold η can be calculated by any one of a number of methods known in the art. The method used in this embodiment of the invention can be shown by the following expression:

$$\overline{A_k}^2 = \overline{A_0}^2 e^{-\lambda k} + \eta^2 \quad (3)$$

where the noise threshold η and exponential decay constant λ represent best fit parameters for an exponentially decaying curve described by equation (2). In equation (2), $A_k$ (with overbar) represents the averaged (stacked) amplitude for the k-th frequency in the segment, averaged over all the columns, and $A_0$ (with overbar) represents the averaged DC amplitude (frequency=0).

For each spatial frequency, as shown at box 58 in FIG. 5, the stacked amplitude at that spatial frequency can then be compared to the noise threshold η as shown in decision box 62. In cases where the stacked amplitudes at any particular spatial frequency do not exceed the noise threshold η, as shown at box 62 in FIG. 5, the values of phase and amplitude at that particular spatial frequency can be omitted from the rest of the calculations, as shown at box 60, and the amplitude analysis as previously described can be then performed on the subsequent spatial frequency (shown in box 60 in FIG. 5 as the spatial frequency index number being incremented by k=k+1).

If the stacked amplitude at the particular spatial frequency $f_k$ exceeds the noise threshold η, then the phase values at that same spatial frequency in each column/segment can be used to calculate a "modified" phase according to the following expression:

$$Q = \frac{\Phi_\alpha - \Phi_{\alpha=0}}{k \cdot \dfrac{M}{2\pi}} \quad (4)$$

where Q represents the modified phase in each column/segment for each spatial frequency, k represents the index number of the particular spatial frequency for which the modified phase is being calculated, and M represents the number of columns in each segment. The modified phase Q can then be used to determine the coefficients a and b from equation (1) by least squares fit or similar process. This is shown at box 64 in FIG. 5. If the selected coefficients a and b result in equation (1) having an error less than a preselected maximum value, as shown at box 66 in equation (1), the resulting equation for the sinusoid (28 in FIG. 3) using these selected coefficients a and b can be used to estimate the angles θ and φ for the feature (22 in FIG. 2) with respect to the axis of the wellbore and the arbitrary reference (26 in FIG. 2), as is shown in box 68 in FIG. 5.

In box 70 in FIG. 5, the angles θ and φ for the feature (22 in FIG. 2) can be converted to geographically referenced angles representing the geographic orientation of the feature (22 in FIG. 2). The process can be repeated, shown at box 72, for successive segments (intervals) until a desired amount (axial span or depth interval) of the wellbore has been analyzed.

The method of the invention does not precisely identify the point of intersection of the feature (22 in FIG. 2) along the axis of the wellbore, but allows calculation of the angles θ and φ for the feature. It should be noted that if several features each having a different orientation appear in any particular segment, these features can be identified using the method of this invention if the amplitude of one particular feature is particularly high and dominates over the amplitudes of the other features extant in the particular interval. Multiple dips (orientations) can therefore be determined using the method of this invention.

Description of an Alternative Embodiment

The process described for the first embodiment of this invention assumes that the radial distance between the wall of the wellbore and the axis of the logging instrument remains substantially constant over any particular segment. As is well known in the art, the logging instrument (10 in FIG. 1) can move off the axis of the wellbore, becoming eccentered in the wellbore. It is also frequently the case that the wall of the wellbore is not smooth and circular. The images developed using methods known in the art can become distorted if the measurements made around the circumference of the wellbore are not all made at the same radial distance from the axis of the wellbore. Distortion in this discussion means that the apparent axial displacements of the feature (22 in FIG. 2) as it intersects the wall of the wellbore will be different from their real values.

In order to reduce the effects of out-of round and roughness of the wellbore wall and eccentering of the logging instrument, this embodiment includes an adjustment for changes in the apparent distance between the logging instrument axis and the wall of the wellbore.

The logging instrument described in the Dory et al '686 patent, referred to earlier, includes caliper measurements for each one of six "arms" to which electrical resistivity pad devices are attached to generate the finely detailed electrical resistivity measurements. Each caliper measurement indicates the amount of lateral extension of the individual arm at each axial position in the wellbore. For purposes of this embodiment, the individual resistivity measurements made on each pad can be assumed to have been made at a radial distance approximately equal to the particular caliper measurement at the particular axial position.

Within each of the previously described column/segments, wherein the measurements are segregated according to the subtended angle $\alpha$ with respect to the arbitrary reference (26 in FIG. 2), an average radius for each column/segment can be calculated by averaging the caliper measurements made in each column over the axial span of each segment. For the electrical resistivity portion of the logging instrument described in the Dory et al '686 patent, the caliper measurement can be used directly from the logging instrument. This also applies to wellbore imaging instruments which have provide only electrical measurements. It should be noted that the average radius measurements for each column/segment should be converted from a measure of actual distance into a number of "samples". Each of the samples should represent the same physical distance as a depth increment (depth sample) used to determine the axial travel of the logging instrument along the wellbore.

For the acoustic imaging section of the logging instrument described in the Dory et al '686 patent, the radial distance for measurements made along each subtended angle $\alpha$ can be determined using the acoustic travel time from the transducer to the wall of the wellbore and back again (reflection time), as is well known in the art. For each column/segment, an average radius can be calculated similar to that calculated from the caliper measurements made in the electrical imaging section of the logging instrument. This also applies to wellbore imaging instruments having only acoustic imaging capability.

Whether generated from caliper or acoustic reflection time measurements, the average radius measurements for each column/segment are used to divide each of the modified phase values calculated in each column/segment, as explained in the first embodiment of the invention. After adjustment for average radius, the adjusted modified phase values can be used to calculate angles $\theta$ and $\phi$ for the features occurring in the particular segment.

Those skilled in the art will devise other embodiments of the invention which do not depart from the spirit of the invention as described herein. Accordingly, the scope of the invention should only be limited by the attached claims.

What is claimed is:

1. A method for determining an orientation of a geologic feature with respect to the axis of a wellbore drilled through earth formations using circumferentially spaced apart measurements of a selected property of said earth formations made along the wall of the wellbore, the method comprising:

segregating said measurements by an angle subtended with respect to a selected reference along said wall of said wellbore;

segregating measurements into a selected axial interval along said wellbore;

transforming the segregated measurements in a direction of the axial interval to give transformed measurements having a phase as a function of spatial frequency, spectrally analyzing said transformed measurements segregated with respect to said subtended angle and said axial interval with respect to the spatial frequency;

determining coefficients which define a best fit curve of the phase components of said spectrally analyzed measurements with respect to said subtended angle; and calculating said orientation from said best fit curve.

2. The method as defined in claim 1 further comprising;

averaging in each said interval amplitude components of said spectrally analyzed measurements for each spatial frequency;

determining a noise floor from said averaged amplitude components;

selecting ones of said frequencies wherein said averaged amplitude components exceeds said noise floor; and determining said coefficients of said best fit curve from phase components of said selected ones of said frequencies.

3. The method as defined in claim 1 further comprising:

calculating an average wellbore radius for each said subtended angle over each segment;

dividing said phase components for each said subtended angle in each said segment by said average wellbore radius for said subtended angle.

4. The method as defined in claim 1 wherein said selected property comprises acoustic reflectance amplitude.

5. The method as defined in claim 1 wherein said selected property comprises electrical resistivity.

6. The method as defined in claim 1 further comprising converting said orientation with respect to said axis of said wellbore and said arbitrary reference to an orientation with respect to gravity and a geographic reference.

7. A method for calculating an orientation of a geologic feature with respect to the axis of a wellbore drilled through earth formations, comprising:

inserting a well logging instrument into said wellbore, said instrument adapted to measure a selected property of said earth formations at a plurality of circumferentially spaced apart locations around a wall of said wellbore;

measuring said selected property of the earth formations made along the wall of said wellbore at said plurality of circumferentially spaced apart locations around said wall of said wellbore;

segregating said circumferentially spaced apart measurements by an angle subtended with respected to a selected reference along the circumference of said wellbore;

transforming the segregated measurements in a direction of the axial interval to give transformed measurements having a phase as a function of spatial frequency, spectrally analyzing said transformed measurements segregated with respect to subtended angle and said axial interval with respect to the spatial frequency;

determining coefficients which define a best fit curve of phase components of said spectrally analyzed measurements with respect to said subtended angle; and calculating said orientation from said best fit curve.

8. The method as defined in claim 7 further comprising;

averaging in each said interval amplitude components of said spectrally analyzed measurements for each spatial frequency;

determining a noise floor from said averaged amplitude components;

selecting ones of said frequencies wherein said averaged amplitude components exceeds said noise floor; and determining said coefficients of said best fit curve from phase components of said selected ones of said frequencies.

9. The method as defined in claim 7 further comprising:

calculating an average wellbore radius for each said subtended angle over each segment;

dividing said phase components for each said subtended angle in each said segment by said average wellbore radius for said subtended angle.

10. The method as defined in claim 7 wherein said selected property comprises acoustic reflectance amplitude.

11. The method as defined in claim 7 wherein said selected property comprises electrical resistivity.

12. The method as defined in claim 7 further comprising converting said orientation with respect to said axis of said wellbore and said arbitrary reference to an orientation with respect to gravity and a geographic reference.

* * * * *